United States Patent Office 3,062,948
Patented Nov. 6, 1962

3,062,948
METHOD OF FORMING HARD SURFACING
Roman F. Arnoldy, P.O. Box 19527, Houston, Tex.
No Drawing. Filed Nov. 16, 1959, Ser. No. 852,977
4 Claims. (Cl. 219—76)

This invention relates to new and useful improvements in methods of forming hard surfacing on articles.

An object of this invention is to provide a new and improved method of forming hard surfacing on articles, particularly by welding procedures.

An important object of this invention is to provide a new and improved method of welding a hard surfacing on an article formed of steel, iron, or an alloy thereof, wherein an envelope gas of nitrogen is employed around a welding arc for the purpose of producing nitrides in the deposited weld metal while simultaneously protecting the molten metal from oxidation by the atmosphere, whereby an extremely hard surfacing on the article is obtained at a relatively low cost.

The preferred embodiment of this invention will be described hereinafter, together with other features therof, and additional objects will become evident from such description.

Briefly, the method of this invention involves the applying or depositing of weld metal by means of an electric arc onto the surface of an article in the presence of an envelope of nitrogen gas so that oxidation of the weld is prevented while simultaneously forming nitrides on the surface of the article in the desired area for providing an extremely hard surfacing. Because of the fact that the nitrogen can be obtained at a relatively low cost, the method of this invention can be performed at a relatively low cost while still obtaining an extremely hard surfacing on the article.

Considering the invention more in detail, the article which is to be hard surfaced may be made of any one of several materials, but in the particular form of the invention herein described, the material of the article to be hard surfaced is iron, steel, or other ferrous or non-ferrous alloys. The hard surfacing on the article is applied in the desired area or areas by the use of electric arc welding wherein an arc is formed between the end of a weld electrode and the surface of the article. The weld electrode may be of the consumable type in which case the electrode through which the electrical current flows actually melts and is deposited as the weld metal. When the electrode is thus deposited, the electrode is preferably formed of steel, iron or other iron base alloy, or other ferrous or non-ferrous alloys of metals such as nickel, cobalt, chromium and the like. It is also possible to use an electrode which is all or substantially all of nickel, cobalt or chromium. In arc welding wherein the weld electrode is thus consumed or deposited, the arc between the weld electrode and the surface of the article causes a melting of the weld electrode and a portion of the article itself so as to form a puddle or a pool of molten metal which is actually a mixture of the metal from the weld electrode and the metal from the surface of the article to which the electrode is being applied. In carrying out the present method of this invention, an envelope of nitrogen gas is provided and is maintained around the arc in the vicinity of the weld rod or electrode which is being deposited on the surface of the article. The nitrogen protects the weld from oxidation by oxygen in the atmosphere and simultaneously the nitrogen is combined with the metal which is in the molten state in the puddle or pool formed by the electric arc whereby nitrides are formed on the surface of the article to provide a hard surfacing thereon.

If a non-consumable weld electrode such as tungsten is used for establishing an arc with the metal to be hard surfaced, then the weld metal is obtained from weld rods which are fed into the arc created between the tungsten electrode and metal to be hard surfaced. No electrical current passes through such weld rods in such case. The weld rods thus used with the non-consumable electrode may be any one of the materials previously referred to in connection with the consumable electrodes, and therefore, using either type of weld electrode, the deposited metal would be the weld metal which is melted in the electric arc. A wide latitude in the material for the weld metal is therefore possible providing the metal is one which is suitable for combining with the nitrogen for forming metal nitrides. The nitrogen is chemically reduced in the electric arc during the welding and such active nitrogen in the arc combines with the weld metal or hard surfacing material to form nitrides which are deposited in mixture with the hard surfacing being applied. These nitrides are extremely hard and add important additions to the carbides in the hard surfacing being applied as the weld deposits to increase the hardness and abrasion resistance by the amount of the nitrides so added.

By reason of the method of this invention, the hard surfacing may be applied to almost any portion or area of a metal article since the application is by welding. For that reason, the process or method of this invention has many applications and uses in situations where it would be difficult, if not impossible, to provide a hard surfacing in certain areas of various articles by other methods. For example, the hard surfacing may be applied by the method of this invention on articles having curved or cylindrical surfaces such as wheels or pipes where it is desired to provide high abrasion resistance, or the hard surfacing may be applied to flat surfaces such as are present on machine ways which are subjected to extreme abrasion and wear conditions. Other uses and applications for the method of this invention will occur to those skilled in the art.

Broadly, the method of this invention contemplates the applying or forming of hard surfacing on various articles by welding procedures wherein an envelope of nitrogen gas is provided for protecting the weld from oxidation and for simultaneously creating nitrides on the surface of the articles.

What is claimed is:

1. A method of applying a hard surfacing on a surface of a metal article, comprising the steps of, melting weld metal with an electric arc, depositing such melted weld metal on the surface of the article while such surface is sufficiently remote from metal articles other than the weld metal to prevent fusion welding of the surface with any metal article other than the weld metal, and forming an envelope of gas consisting essentially of nitrogen around the electric arc in the vicinity of the metal being deposited to protect the weld from oxidation and to simultaneously cause some of the nitrogen and the metal being deposited as a hard surfacing to combine with each other to form nitrides which increases the hardness and abrasion resistance of the hard surfacing by the amount of the nitrides added to the deposited metal.

2. The method set forth in claim 1, wherein the metal article and the weld metal are each selected from a group consisting of iron, steel and other ferrous and non-ferrous alloys.

3. The method of applying a hard surfacing on a surface of a metal article, comprising the steps of, generating an electrical arc between a non-consumable weld electrode and the surface of the article to be hard surfaced, maintaining an envelope of gas consisting essentially of nitrogen around the arc, feeding a weld rod into the arc to melt same and to combine same with some of the nitrogen in the envelope for forming hard surfacing nitrides in the weld metal deposited as a hard surfacing on the article while simultaneously protecting the weld from oxidation, and positioning said surface of the metal article sufficiently remote from metal articles other than said weld rod to prevent fusion welding of said surface with any metal article other than said weld rod, whereby the hardness and abrasion resistance of the hard surfacing is increased by the amount of the nitrides added to the deposited metal.

4. The method set forth in claim 3, wherein the material of the metal article and of the weld rod are each selected from a group consisting of iron, steel and other ferrous and non-ferrous alloys.

References Cited in the file of this patent

UNITED STATES PATENTS

| | | |
|---|---|---|
| 1,309,696 | Roberts et al. | July 15, 1919 |
| 1,354,266 | Plant | Sept. 28, 1920 |
| 1,589,017 | Lincoln | June 15, 1926 |
| 1,746,196 | Langmuir et al. | Feb. 4, 1930 |
| 1,977,128 | Hawkins | Oct. 16, 1934 |
| 2,847,555 | Yenni | Aug. 12, 1958 |
| 2,939,942 | Scheil | June 7, 1960 |